United States Patent [19]
Dees et al.

[11] Patent Number: 6,073,889
[45] Date of Patent: Jun. 13, 2000

[54] WING FLAP SEAL BUMP

[75] Inventors: Paul W. Dees, Redmond; Michael J. Irish, Renton; Thomas A. Zierten, Bellevue, all of Wash.

[73] Assignee: The Boeing Company, Seattle, Wash.

[21] Appl. No.: 09/173,922

[22] Filed: Oct. 16, 1998

Related U.S. Application Data

[60] Provisional application No. 60/062,862, Oct. 16, 1997.

[51] Int. Cl.[7] ............................................. B64C 3/50
[52] U.S. Cl. ........................ 244/213; 244/214; 244/130
[58] Field of Search .................................. 244/213, 214, 244/215, 130

[56] References Cited

U.S. PATENT DOCUMENTS

| | | | |
|---|---|---|---|
| 2,207,242 | 7/1940 | De Seversky | 244/130 |
| 2,927,749 | 3/1960 | Brownell | 244/130 |
| 3,968,946 | 7/1976 | Cole | 244/130 |
| 4,384,693 | 5/1983 | Pauly et al. | 244/214 |

*Primary Examiner*—Galen L. Barefoot
*Attorney, Agent, or Firm*—Christenson, O'Connor, Johnson and Kindness PLLC

[57] ABSTRACT

A sealing device (20) for an airplane (22). The airplane having a wing (24) and a first engine nacelle (26) attached to the wing. The wing having a wing root, a wing tip, a leading edge, a trailing edge and at least a first flap (30b) operatively connected to the leading edge. The flap being actuatable between a retracted position and an extended position. The flap in the extended position defining a gap between the flap and engine nacelle. The sealing device includes a body attached to the engine nacelle. The body having a forward portion (54), a center portion (56) and an aft portion (58). The body being positioned on the engine nacelle to contact the flap when the flap is in the extended position and forming a seal between the flap and nacelle to improve aerodynamic efficiency of the wing. The seal is formed by the flap being nested within the center portion of the body when the flap is in the extended position. The seal contours airflow along a spanwise direction defined by an axis extending between the wing root and tip to improve aerodynamic efficiency of the wing.

18 Claims, 4 Drawing Sheets

WING FLAP SEAL BUMP

This application claims the benefit of U.S. Provisional Application Serial No. 60/062,862, filed on Oct. 16, 1997.

FIELD OF THE INVENTION

The present invention relates generally to high-lift devices for airplanes and, in particular, to an aerodynamic seal for high-lift devices.

BACKGROUND OF THE INVENTION

Modern commercial aircraft have a variety of high-lift devices, such as leading edge flaps, to increase the lifting ability, while maximizing the lift-to-drag ratio of the aircraft. Typically, high-lift devices may be actuated between a stowed position for high-speed aerodynamic performance and an extended position for low-speed aerodynamic performance. In the extended position, such devices are deployed to increase the camber of the wing and, therefore, increase the lift of the aircraft at slower speeds. However, the effectiveness of such leading edge high-lift devices is determined, at least in part, by airflow leakage at the ends of such devices, particularly adjacent to fixed structure along the wing span.

For example, in an airplane where an engine nacelle is closely coupled or mounted to the wing, such as a Boeing 737, the leading edge flap is contoured to clear the engine nacelle when the flap is deployed. As a result, the leading edge of the flap has a uniquely arcuate shape spaced from the nacelle sufficiently, such that airflow leakage is present between the flap and the nacelle.

In the past, leading edge flaps of such airplanes have included a pair of doors hingedly attached to the leading edge flap. One of the doors is attached adjacent to the flap and extends from the outboard facing side of the engine strut to the inboard facing edge of the leading edge flap. The second door is hingedly attached to the arcuate section of the leading edge flap. Each door has a lower edge that is curved in a manner that conforms with the circumference of the engine nacelle. The lower free edge of the leading edge flap is formed of a resilient material. The material engages and compresses against the nacelle when the minimum clearance of the flap actuation is reached. The material expands as the flap is extended into the extended position, such that the material is compressed from a greater-to-lesser extent during actuation of the flap.

SUMMARY OF THE INVENTION

The present invention provides an aerodynamic sealing device for an airplane having a leading edge flap with an end or corner section adjacent to an engine nacelle attached to the wing. The flap may be actuated between a retracted position and an extended position. During travel of the flap, the end or corner section passes along the nacelle. The sealing device of the present invention includes a body fastened to the engine nacelle and precisely contoured so as to eliminate any gap between the flap and the nacelle when the flap is extended.

In an aspect of a sealing device in accordance with the present invention, an aerodynamic seal is formed by the flap being nested within a central portion of the body when the flap is in the extended position. The seal contours airflow along a spanwise direction defined by an axis extended between the root and tip of the wing to improve aerodynamic efficiency.

In yet another aspect of a sealing device in accordance with the present invention, the seal between the body and flap contours airflow along a chordwise direction defined by an axis extended between the leading and trailing edges of the wing to improve aerodynamic efficiency.

In still another aspect of the invention, the body of the sealing device is contoured to minimize aerodynamic drag when the flap is in the retracted position. Also, a forward portion of the body is contoured to optimize high-speed aerodynamics of the sealing device.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
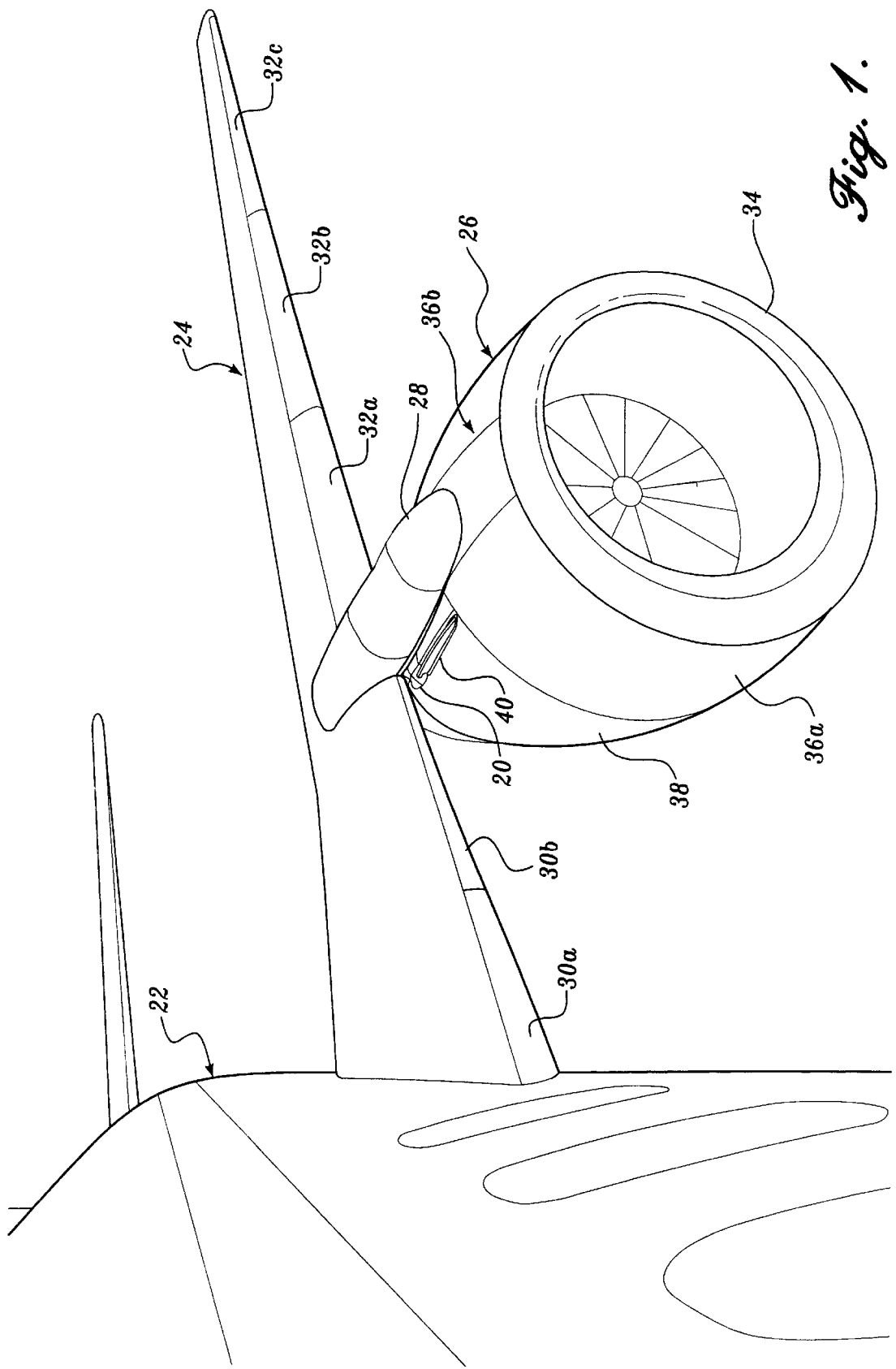
FIG. 1 is a top front perspective of a sealing device constructed in accordance with the present invention, attached to an engine nacelle of an aircraft.

FIG. 1 illustrates a preferred embodiment of a sealing device 20 constructed in accordance with the present invention. The sealing device 20 is shown attached to an aircraft 22 having a wing 24 and an engine 26. The engine 26 is rigidly attached close and underneath the wing 24 by a short engine strut 28. The wing 24 includes a plurality of high-lift devices, such as inboard and outboard leading edge flaps 30a and 30b and leading edge slats 32a, 32b and 32c. Of particular concern is the outboard leading edge flap 30b. This flap has an outer end adjacent to the engine strut 28. Flap 30b is pivoted to the wing leading edge by hinge arms.

Figure 4:
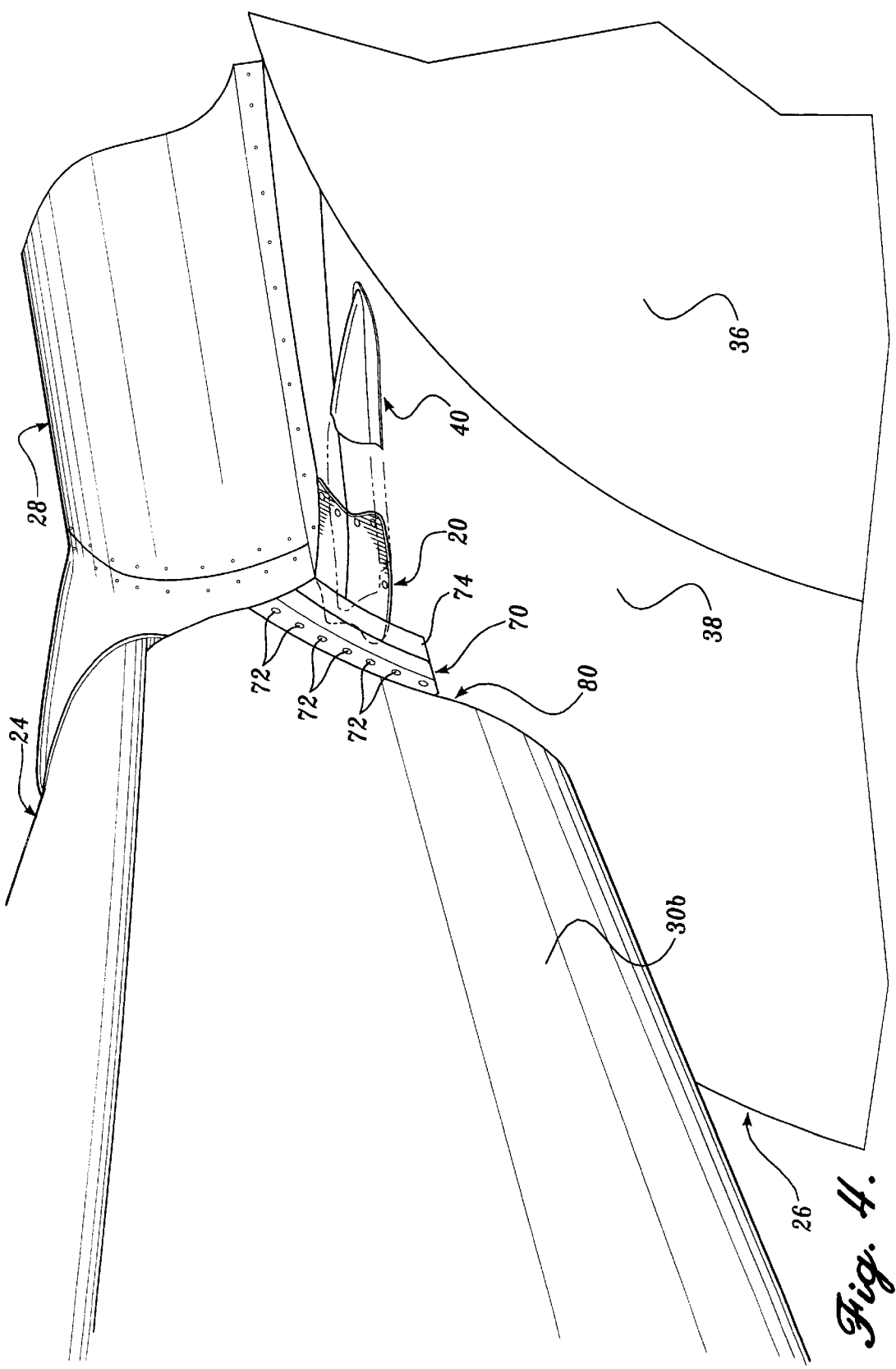
FIG. 4 is a further enlarged perspective of the sealing device of FIG. 1, showing the aircraft leading edge flaps in an extended position and in contact with the sealing device to seal airflow in both the chordwise and spanwise directions of the wing.

The outboard flap 30b is swung by fluid pressure actuators between a retracted position (FIG. 1) and an extended position (FIG. 4). In the retracted position, the flap 30b is stowed within the leading edge of the wing 24 and forms a smooth undersurface. From the retracted position, flap 30b is deployed by the actuators rotating the flap 30b downward and forward from the leading edge of the wing 24. In the extended position, flap 30b increase the camber of the wing, thereby increasing the maximum lift of the wing 24. Such flaps 30b are sometimes referred to as "Krueger flaps."

The engine 26 includes an inlet cowl 34, an inboard and outboard fan cowl 36a and 36b and an inboard and outboard thrust reverser sleeve 38. As is well-known in the art, the fan cowls and the thrust reverser sleeves are symmetrically formed and pivotally attached to the engine 26. The thrust reverser sleeve 38 has an increasing diameter from the aft end to the forward end of the sleeve. As may be best seen by referring to FIG. 2, the thrust reverser sleeve 38 includes a stationary portion 50 adjacent to the strut 28 and a translating portion 52 farther from the strut 28. The pilot may activate the engine thrust reverser to assist in the deceleration of the aircraft on the ground. When the thrust reverser is activated, the translating portion 52 of the thrust reverser sleeve 38 is moved rearward to deflect at least a portion of the thrust from the engine 26 forward to significantly decelerate the airplane.

A seal door deflector 40 is rigidly attached to the upper surface of the thrust reverser sleeve 38 by suitable fasteners, such as rivets. The seal door deflector 40 is a thin, sturdy, generally radially extending strip of material that extends fore and aft along the thrust reverser sleeve 38. The seal door deflector 40 is positioned on the thrust reverser sleeve 38, such that when the engine thrust reverser is engaged to translate the thrust reverser sleeve 38 rearward, the seal door deflector 40 displaces a swingable "door" portion of the outboard leading edge flap 30b, as is described in greater detail below. Without the swingable door portion, the outboard edge of the flap 30b would have to be spaced further from the translating portion of the thrust sleeve to permit the rearward translation during thrust reversal when the flap is in its extended high lift position.

Figure 2:
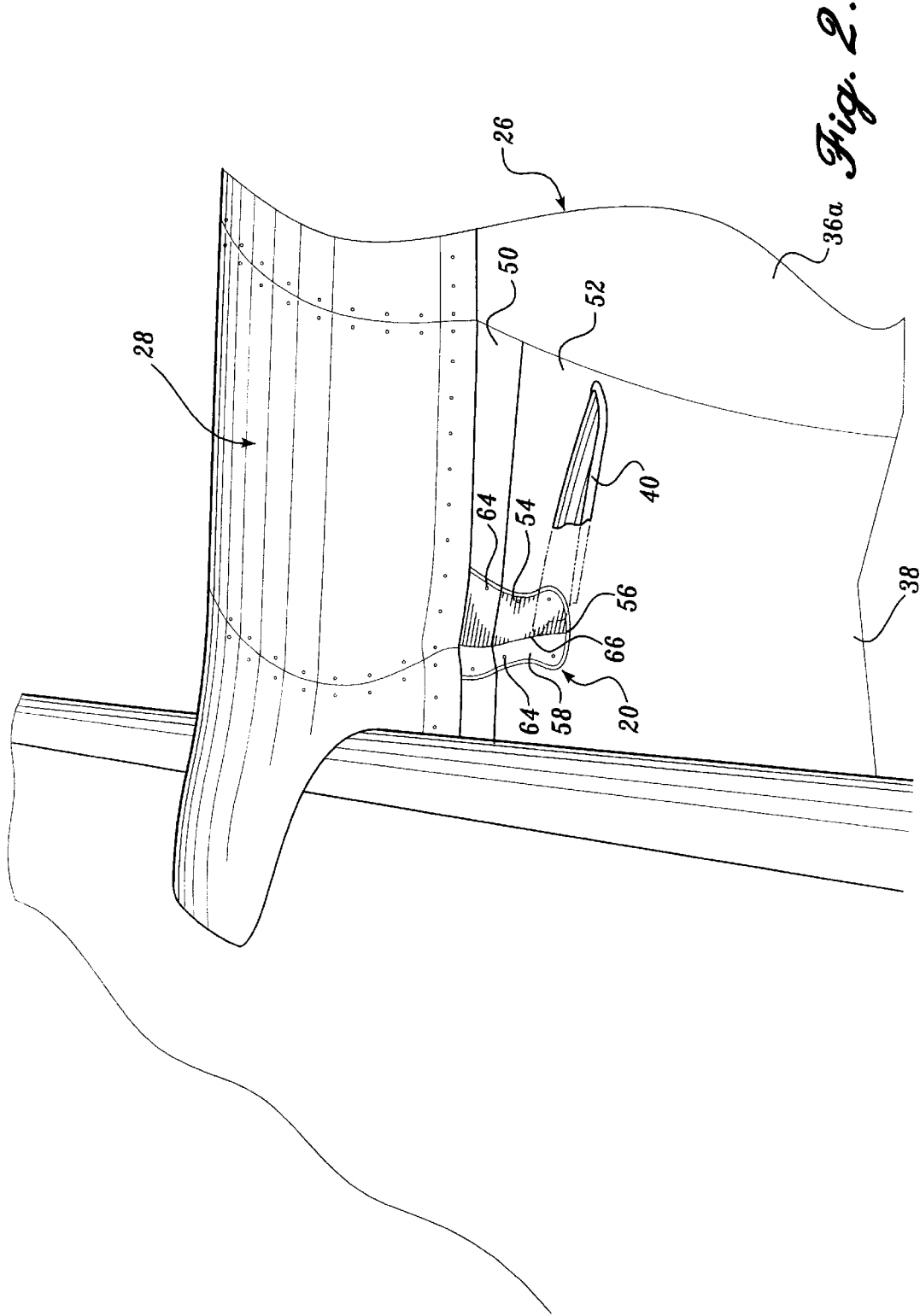
FIG. 2 is an enlarged perspective of the sealing device of FIG. 1, with the wing and engine partially cut away for clarity.

Still referring to FIG. 2, the sealing device 20 includes a forward portion 54, a center portion 56 and an aft portion 58. The sealing device 20 has component parts on the stationary portion 50 and on the translating portion 52 of the thrust reverser sleeve 38. The sealing device 20 is adjacent to the engine strut 28 and extends from the inboard facing side of the engine strut 28 to a location near the outboard facing side of the seal door deflector 40. The sealing device 20 is curved circumferentially to match the outer contour of the thrust reverser sleeve 38, such that the sealing device 20 is mounted flush to the outer surface of the thrust reverser sleeve 38.

The sealing device 20 is preferably injection molded from glass reinforced polyetherimide and includes internal reinforcement ribs and bosses for securing the sealing device to the thrust reverser sleeve 38. Preferably, the sealing device 20 may be fastened to the thrust reverser sleeve 38 with suitable fasteners, such as rivets 64. Alternatively, the sealing device may be integrally formed with the engine. The forward portion 54 of the sealing device 20 is aerodynamically contoured for high-speed aerodynamic performance. The forward portion 54 is contoured such that it meets the thrust reverser sleeve 38 almost tangentially and extends substantially linearly aftward to the center portion 56 where it forms a peak 66. The aft portion 58 is blended from the contour of the thrust reverser sleeve 38 and is curved concavely at a predetermined radius of curvature to the peak 66. Thus, the sealing device 20 is a continuous piece that has a forward portion 54 that is sloped linearly aftward to a peak 66 where it transitions into a concavely curved aft portion 58. Further, the forward portion 54 is contoured to minimize aerodynamic drag and, therefore, does not unduly interfere with aerodynamic flow over the engine nacelle when flap 30b is retracted.

Figure 3:
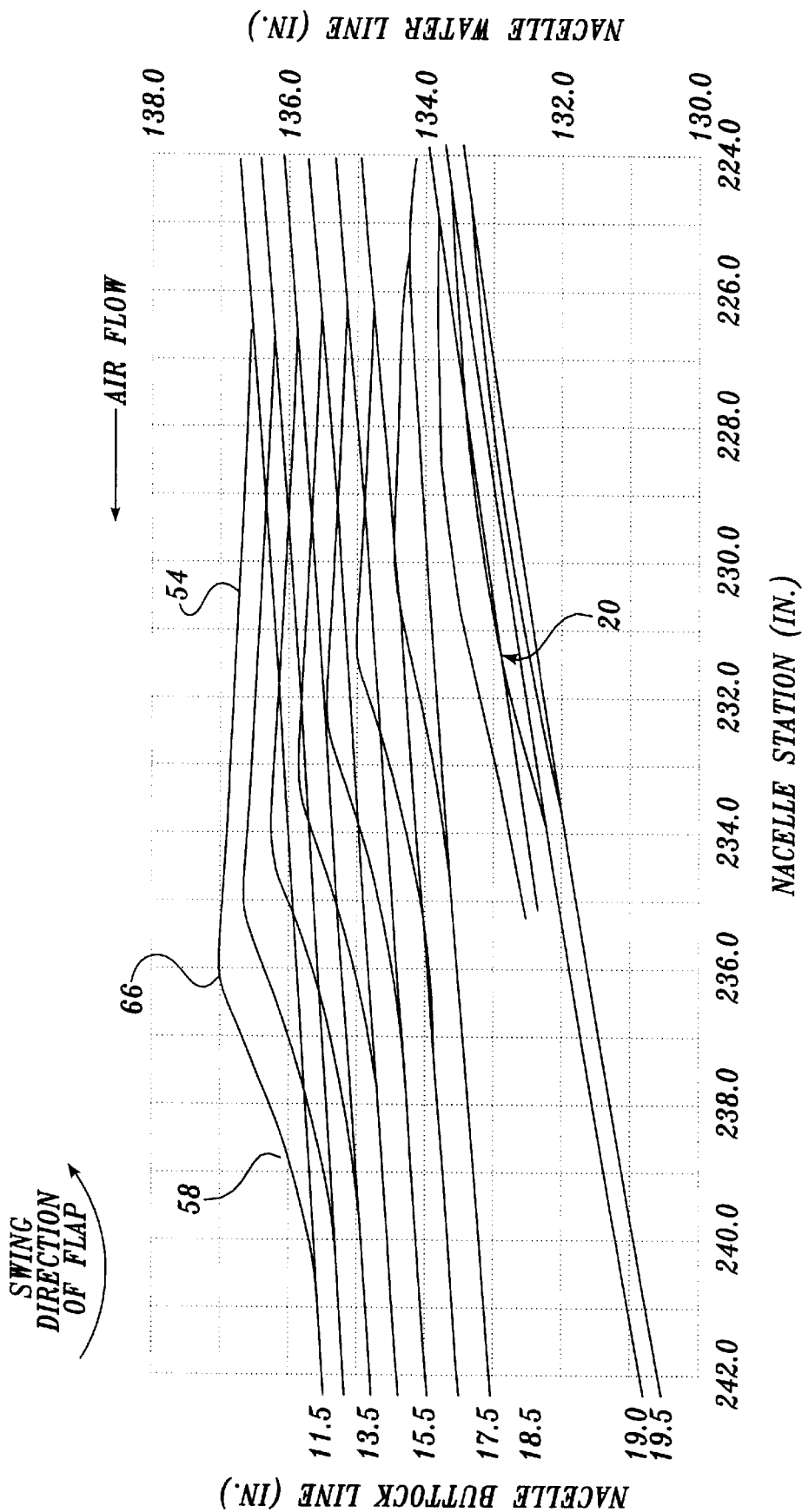
FIG. 3 is a contour view of the sealing device of FIG. 1, showing longitudinal cuts of the sealing device at different vertical section lines spaced different distances from the central vertical plane of the engine.

Referring now to FIG. 3, the contour of the sealing device 20 will be described in greater detail. FIG. 3 is a three-dimensional view of the loft of the sealing device 20. In particular, the location of the sealing device 20 on the engine nacelle includes its dimensions in the vertical direction, expressed in terms of the nacelle water line, in the lateral direction, expressed in terms of nacelle buttock line, and in the longitudinal direction, expressed in terms of the nacelle station location. As seen in FIG. 3, the forward portion 54 has a linear slope from the forward edge of the sealing device 20 to the peak 66. As is described in greater detail below, the aft portion 58 is curved concavely at a constant radius of curvature from the aft end of the sealing device 20 to the peak 66. The forward and aft portions 54 and 58 are smoothly blended at the peak 66, such that the sealing device 20 is smoothly contoured from the forward portion 54 over the peak 66 to the aft portion 58.

With reference to FIG. 3, the distance from the aft-most section of the sealing device 20 to the peak 66 can be approximately 6 inches in a representative embodiment. This distance is much shorter than the forward portion 54, which can extend forward from the peak 66 approximately 10 inches or more. The transverse extent of the sealing device 20 can be about 8 inches. The maximum height of the sealing device 20, above the cylindrical nacelle profile, can be about one inch. Further, the peak 66 lays in a plane approximately parallel to leading edge of the wing, which is swept relative to the centerline of the engine.

Operation of the sealing device 20 may be best understood by referring to FIG. 4. In that view, the engine 26, wing 24 and engine strut 28 have been partially cut away for clarity. The outboard leading edge flap 30b is in the fully extended position for low-speed conditions, such as when the aircraft is landing or taking off. Because the engine 26 is closely mounted or coupled to the wing 24 by the engine strut 28, the outboard lower corner of the leading edge flap 30b is partially cut away to define an arcuate section 80. The arcuate section 80 is curved to permit the flap 30b to be fully extended without striking the engine 26.

Flap 30b includes a seal door 70 hinged to the arcuate section 80 of the flap 30b. The seal door 70 is spring-loaded to a position aligned with the remainder of the flap 30b when the flap 30b is in the extended position. Because the diameter of the thrust reverser sleeve 38 is greater at the forward end than the aft end, when the thrust reverser is activated and the sleeve 38 is moved rearwardly, the sleeve 38 would strike the seal door 70. Thus, to accommodate for action of the thrust reversers with the flaps extended, the seal door deflector 40 engages the seal door 70 to pivot the seal door 70 out of the path of the sleeve 38. As the thrust reverser sleeve 38 is slid rearward, the seal door deflector 40 engages the seal door 70 to swing it rearward, against the force of the biasing springs.

As may be best seen by referring back to FIG. 3, the aft portion 58 of the sealing device 20 is concave. As shaped, the aft portion 58 corresponds closely to the swing radius of the lower edge of the seal door 70 when the flap 30b is actuated into the extended position. As is well known in the art, the flap 30b swings down and forward from the stowed position, past a minimum clearance position, where the lower outboard corner is closest to the engine nacelle to the extended position. In the extended position, the leading edge of the flap is at a predetermined angle to the nacelle. The curvature of the aft section 58 is constant and selected to allow the seal door 70 to pass close to and in sliding contact with the upper surface of the sealing device 20, minimizing wear due to sliding contact with the bottom edge of the seal door 70. The aft portion 58 begins approximately at the minimum clearance position of the seal door 70 as it is actuated between the extended and retracted positions. The aft portion 58 curves at a predetermined radius to the peak 66, which is located substantially at the fully extended position of the flap 30b. Further, the radius of curvature of the aft portion 58 is a function of the swing radius of the flap 30b, such that as the flap 30b is actuated between the extended and retracted positions, at least a portion of the seal door 70 is in sliding contact with the aft portion 58 to define a seal therebetween. Thus, the constant radius of curvature of the concave aft portion 58 of the sealing device 20 is greater than the swing radius of the flap 30b, such that at least a portion of the bottom edge of the seal door 70 is in sliding contact with the sealing device 20 as the flap 30b is actuated into the extended position.

When the flap 30b is fully extended, the seal door 70 forms a smooth continuation of the peak 66 to improve the aerodynamic profile of the wing 24 in the low-speed, high-lift configuration. The bottom edge of the seal door 70 also include a thin, resilient gasket 74 to improve the seal between the sealing device 20 and the seal door 70. Because the aft portion 58 has a constant radius of curvature, as the flap 30b swings down and forward from the stowed to the extended positions, the gasket 74 is in continuous contact with the surface of the sealing device 20 and forms a seal of constant compression therebetween. As seen in FIG. 4, the lower portion of the seal door 70 is nested within the center portion 56 of the sealing device 20 to form a continuous seal therebetween. In particular, when the flap 30b is fully extended, the seal door 70 engages the peak 66 of the sealing device 20 and forms a fairly smooth continuation of the peak 66 to improve the aerodynamic profile of the wing in the low-speed, high-lift configuration. The seal contours airflow in both the spanwise and chordwise direction of the wing 24 to improve aerodynamic efficiency of the wing in the low-speed configuration. Sealing the leading edge flap 30b to the engine 26 with the sealing device 20 increases the lift-to-drag ratio of the wing when compared to an aircraft without the sealing device 20 and results in a substantial increase in acceptable payload for the aircraft, equivalent to additional passengers being carried.

It will be apparent to those ordinary skill in the art that the embodiment of the invention illustrated and described herein is exemplary and, therefore, changes may be made to the foregoing embodiment. As a nonlimiting example, the sealing device may be attached to the airplane having more than two engines, such as an airplane having four engines. As a second nonlimiting example, the radius of curvature of the aft portion, as well as the height of the sealing device, to accommodate the swing radius of the leading edge flap. Thus, it should be appreciated that various changes can be made to the preferred embodiment of the invention without departing from the spirit and scope of the invention.

The embodiments of the invention in which an exclusive property or privilege is claimed are defined as follows:

1. An aerodynamic sealing device for an airplane having a wing and a first engine nacelle attached to the wing, the wing having a wing root, a wing tip, a leading edge, a trailing edge and at least a first flap operatively connected to the leading edge, the flap being actuatable between a retracted high speed position and an extended high lift position, the flap in the extended position defining a gap between the flap and the engine nacelle, the sealing device comprising:

(a) a fixed body fastened to the engine nacelle, the fixed body having a forward portion, a center portion, and an aft portion, the fixed body sealing the gap by selectively being placed into contact with the flap when the flap is in the extended position.

2. The sealing device of claim 1, wherein the flap is nested within the center portion of the fixed body when the flap is in the extended position to form a seal therebetween, the seal contouring airflow along a spanwise direction defined by an axis extending between the root and tip of the wing to improve aerodynamic efficiency.

3. The sealing device of claim 2, wherein the seal between the fixed body and flap improves aerodynamic efficiency by sealing airflow along a chordwise direction defined by an axis extending between the leading and trailing edges of the wing.

4. The sealing device of claim 3, wherein the fixed body is contoured to minimize aerodynamic drag when the flap is in the retracted position.

5. The sealing device of claim 4, wherein the forward portion is contoured for optimized high-speed aerodynamic efficiency.

6. The sealing device of claim 2, wherein the aft portion of the fixed body is concavely contoured to allow the flap to pass close to the fixed body as the flap is actuated between the retracted and extended positions.

7. The sealing device of claim 6, wherein the radius of curvature of the aft portion of the fixed body is constant.

8. An airplane and aerodynamic sealing device, the airplane having a wing and a first engine nacelle attached to the wing, the wing having a wing root, a wing tip, a leading edge, a trailing edge and at least a first flap operatively connected to the leading edge, the flap being actuatable between a rearward swung retracted position and a forwardly extended position, the flap in the fully extended position defining a gap between the flap and the engine nacelle, the sealing device comprising:

(a) a fixed body fastened to the engine nacelle, the fixed body having a forward portion, a center portion and an aft portion, the fixed body being positioned on the engine nacelle to contact the flap when the flap is in the extended position and forming a seal between the flap and nacelle to improve aerodynamic efficiency of the wing.

9. The airplane and aerodynamic sealing device of claim 8, wherein the seal is formed by the flap being nested within the center portion of the fixed body when the flap is in the fully extended position, the seal contouring airflow along a spanwise direction defined by an axis extending between the wing root and tip to improve aerodynamic efficiency.

10. The airplane and aerodynamic sealing device of claim 9, wherein the seal between the fixed body and flap contours airflow along a chordwise direction defined by an axis extending between the leading and trailing edges of the wing to improve aerodynamic efficiency.

11. The airplane and aerodynamic sealing device of claim 10, wherein the fixed body is contoured to minimize aerodynamic drag when the flap is in the retracted position.

12. The airplane and aerodynamic sealing device of claim 11, wherein the forward portion is contoured for optimized high-speed aerodynamic efficiency.

13. The airplane and aerodynamic sealing device of claim 8, wherein the aft portion of the fixed body is concavely contoured to allow the flap to pass closely to the fixed body as the flap is actuated between the retracted and extended positions.

14. The sealing device of claim 13, wherein the radius of curvature of the aft portion of the fixed body is constant.

15. In an airplane having a wing and a first engine nacelle attached to the wing, the wing having a wing root, a wing tip, a leading edge, a trailing edge and at least a first flap operatively connected to the leading edge, the flap being actuatable between a retracted position and an extended position, the flap having a bottom edge swinging along a predetermined swing radius from the retracted position, past a minimum clearance position, wherein the edge of the flap passes the engine nacelle at a minimum distance, to the fully extended position, the flap in the extended position defining a gap between the flap and the engine nacelle, the improvement comprising:

(a) a fixed sealing device fastened to the engine nacelle, the fixed sealing device having a forward portion, a center portion, and an aft portion, the fixed sealing device being positioned on the engine nacelle to contact the flap when the flap is in the extended position and forming a seal between the flap and the nacelle to improve aerodynamic efficiency of the wing.

16. The improvement of claim 15, wherein the seal is formed by the flap being nested within the center portion of the fixed sealing device when the flap is in the extended position, the seal contouring airflow along a spanwise direction defined by an axis extending between the root and tip of the wing to improve aerodynamic efficiency.

17. The improvement of claim 16, wherein the seal between the fixed sealing device and flap contours airflow along a chordwise direction defined by an axis extending between the leading and trailing edges of the wing to improve aerodynamic efficiency.

18. The improvement of claim 17, wherein the forward portion is contoured for optimized high-speed aerodynamic efficiency.

* * * * *